US008621186B2

(12) United States Patent
Darmon et al.

(10) Patent No.: US 8,621,186 B2
(45) Date of Patent: Dec. 31, 2013

(54) OBFUSCATED HARDWARE MULTI-THREADING

(75) Inventors: David Darmon, Jerusalem (IL); Uri Kaluzhny, Ramat Beit Shemesh (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/883,937

(22) PCT Filed: Nov. 14, 2011

(86) PCT No.: PCT/IB2011/055060
§ 371 (c)(1),
(2), (4) Date: Jun. 14, 2013

(87) PCT Pub. No.: WO2012/066458
PCT Pub. Date: May 24, 2012

(65) Prior Publication Data
US 2013/0262825 A1    Oct. 3, 2013

(30) Foreign Application Priority Data
Nov. 16, 2010  (GB) .................................. 1019332.4

(51) Int. Cl.
*G06F 21/00*    (2013.01)
*G06F 9/38*    (2006.01)

(52) U.S. Cl.
USPC .......................................... 712/220; 712/219

(58) Field of Classification Search
None
See application file for complete search history.

(56) References Cited

U.S. PATENT DOCUMENTS

| 5,867,701 A | 2/1999 | Brown et al. |
| 6,076,159 A * | 6/2000 | Fleck et al. ............... 712/241 |
| 6,370,638 B1 * | 4/2002 | Yamasaki ................... 712/219 |
| 6,594,755 B1 | 7/2003 | Nuechterlein et al. |
| 6,704,863 B1 | 3/2004 | Paul et al. |
| 7,062,606 B2 * | 6/2006 | Ober et al. ................. 711/121 |
| 7,596,683 B2 * | 9/2009 | Morrow ....................... 712/228 |
| 2005/0149699 A1 * | 7/2005 | Norden et al. .............. 712/219 |
| 2009/0010424 A1 | 1/2009 | Qi et al. |
| 2009/0113189 A1 | 4/2009 | Myles |

FOREIGN PATENT DOCUMENTS

| EP | 1 416 376 A2 | 5/2004 |
| WO | WO 02/27478 A1 | 4/2002 |

OTHER PUBLICATIONS

Mar. 5, 2012 International Search Report for the captioned application.
Mar. 5, 2012 Written Opinion of the International Searching Authority for the captioned application.
Mar. 2, 2011 Office Communication in connection with prosecution of GB 1019332.4.
"Bubble (computing)" (Wikipedia Oct. 1, 2011).
"Multithreading" (Wikipedia Aug. 12, 2010).

* cited by examiner

*Primary Examiner* — Eric Coleman
(74) *Attorney, Agent, or Firm* — Husch Blackwell LLP

(57) ABSTRACT

Obfuscating a multi-threaded computer program is carried out using an instruction pipeline in a computer processor by streaming first instructions of a first thread of a multi-threaded computer application program into the pipeline, the first instructions entering the pipeline at the fetch stage, detecting a stall signal indicative of a stall condition in the pipeline, and responsively to the stall signal injecting second instructions of a second thread of the multi-threaded computer application program into the pipeline. The injected second instructions enter the pipeline at an injection stage that is disposed downstream from the fetch stage up to and including the register stage for processing therein. The stall condition exists at one of the stages that is located upstream from the injection stage.

26 Claims, 7 Drawing Sheets

OBFUSCATED HARDWARE MULTI-THREADING

This application is a 371 submission of international application no. PCT/IB2011/055060, filed 14 Nov. 2011, entitled Obfuscated hardware Multi-Threading, and published in the English language on 24 May 2012 with publication number WO 2012/066458 A1, which claims the benefit of the filing date of GB 1019332.4, filed 16 Nov. 2010.

FIELD OF THE INVENTION

This invention relates to a method of obfuscated computer program execution and a corresponding processing system. More particularly, this invention relates to obfuscated injection of a secure thread of a multi-threaded program into a central processing unit.

BACKGROUND TO THE INVENTION

The meanings of certain acronyms and abbreviations used herein are given in Table 1.

TABLE 1

Acronyms and Abbreviations

| | |
|---|---|
| AES | Advanced Encryption Standard |
| ALU | Arithmetic Logical Unit |
| CPU | Central Processing Unit |
| NOP | No Operation instruction |
| RISC | Reduced Instruction Set Computer |

Embedded security refers to security features built into a device, including physical tamper-resistance features, cryptographic keys and algorithms. Embedded security features can be found today on a variety of computing devices, e.g., personal computers and servers, cellular telephones, set-top boxes, and many appliances.

Many modern computers have hardware support that enables them to execute multiple threads, i.e., paths of execution of program code, efficiently, even though the separate instruction streams comprising each thread may treat a CPU and its instruction pipeline as a shared resource.

Hiding information in an instruction pipeline is proposed in U.S. Patent Application Publication No. 2009/0113189. Pipeline stalls in executable code are located. Secret information taken from a first location is encoded as computer instructions configured to perform some function when executed on a pipeline processor. The encoded information is inserted into the executable code at the stalls. At a second location the encoded information is extracted from the instructions located at the stalls and decoded.

SUMMARY OF THE INVENTION

An aspect of the present invention is concerned with preventing detection of secure components of a computer program, more specifically with providing obfuscation of a secure thread of a multithreaded program, which executes concurrently with non-secure threads by providing a modified instruction pipeline.

There is provided according to an aspect of the invention a new architecture adapted to CPU multithreading, wherein non-secure threads are processed via the standard interface (Fetch stage) and secure thread instructions are injected immediately into the register stage in an unpredictable and obfuscated manner. The secure and non-secure threads execute in parallel, sharing most of the CPU real estate, thereby engendering little additional cost as compared with a conventional general purpose CPU. The approach taken conceals the processing of secure instructions inside the same CPU as non-secure instructions, which constitutes a defence against various side-channel attacks.

There is further provided according to embodiments of the invention a method of obfuscating a multi-threaded computer program, which is carried out by operating an instruction pipeline in a computer processor, the pipeline including a plurality of stages including a fetch stage for fetching computer instructions, an execution stage downstream of the fetch stage for executing computer instructions and a register stage therebetween for accessing a register file. The method is further carried out by streaming first instructions of a first thread of a multi-threaded computer application program into the pipeline, the first instructions entering the pipeline at the fetch stage, detecting a stall signal indicative of a stall condition in the pipeline, and responsively to the stall signal injecting second instructions of a second thread of the multi-threaded computer application program into the pipeline, the injected second instructions entering the pipeline at an injection stage that is disposed downstream from the fetch stage up to and including the register stage for processing therein. The stall condition exists at one of the stages that are located upstream from the injection stage.

An aspect of the method includes transferring the second instructions from the injection stage to the execution stage and executing the second instructions using the execution stage. The injection stage may be the register stage.

Another aspect of the method comprises detecting an additional signal indicating an absence of a stall condition in the injection stage before injecting second instructions therein.

According to another aspect of the method, the stall condition exists at a decode stage located upstream of the register stage.

According to still another aspect of the method, the injection stage is downstream from the decode stage.

Another aspect of the method includes fetching the first instructions into the pipeline from a first memory address space using a first bus, and fetching the second instructions into the pipeline from a second memory address space using a second bus. Fetching the first instructions may be performed independently of fetching the second instructions.

According to yet another aspect of the method, injecting second instructions includes providing an ancillary program counter for selecting addresses to be fetched from the second memory address space.

According to a further aspect of the method, the second thread has a flow of control that is unaffected by processing the injected second instructions in the pipeline.

According to still another aspect of the method, the first instructions and the second instructions operate on a first set of registers and a second set of registers, respectively.

An additional aspect of the method includes generating the stall signal irrespective of an existence of the stall condition for a time sufficient to guarantee a minimum predetermined execution of the second thread.

One aspect of the method includes multiplexing the first thread and the second thread in the register stage of the pipeline.

There is also provided according to embodiments of the invention an apparatus for use in a computing device for obfuscating a multi-threaded computer program, including a computer processor, and an instruction pipeline in the computer processor. The pipeline has a plurality of stages including a fetch stage for fetching computer instructions, an execution stage disposed downstream of the fetch stage for executing computer instructions, and a register stage therebetween for accessing a register file. The pipeline is operative for streaming first instructions of a first thread of a multi-threaded computer application program into the pipeline, the first instructions entering the pipeline at the fetch stage. The apparatus includes a code injector operative for detecting a stall signal indicative of a stall condition in the pipeline, and responsively to the stall signal injecting second instructions of a second thread of the multi-threaded computer application program into the pipeline. The injected second instructions enter the pipeline at an injection stage that is disposed downstream from the fetch stage up to and including the register stage for processing therein, wherein the stall condition exists at one of the stages that are located upstream from the injection stage.

According to an aspect of the apparatus, the pipeline is operative for transferring the second instructions from the injection stage to the execution stage and executing the second instructions using the execution stage. The injection stage may be the register stage.

In another aspect of the method the pipeline is operative for detecting an additional signal indicating an absence of a stall condition in the injection stage before injecting second instructions therein.

According to still another aspect of the apparatus, the stall condition exists at a decode stage.

According to another aspect of the apparatus, the injection stage is downstream from the decode stage.

Yet another aspect of the apparatus includes a first bus and a second bus, wherein the pipeline is operative for fetching the first instructions into the pipeline from a first memory address space using the first bus, the code injector is operative for fetching the second instructions into the pipeline from a second memory address space using the second bus.

According to an additional aspect of the apparatus, the fetch stage and the code injector are independently operative for fetching the first instructions and fetching the second instructions, respectively.

According to a further aspect of the apparatus, the code injector includes an ancillary program counter for selecting addresses of the second instructions to be fetched from the second memory address space.

According to aspect of the apparatus, the second thread has a flow of control that is unaffected by processing the injected second instructions in the pipeline.

According to one aspect of the apparatus, the computer processor includes a first set of registers and a second set of registers, wherein the first instructions and the second instructions specify the first set of registers and the second set of registers, respectively.

The apparatus may include a generator operative for raising the stall signal irrespective of an existence of the stall condition for a time sufficient to guarantee a minimum predetermined execution of the second thread.

The apparatus may include a multiplexor in the pipeline for multiplexing the first thread and the second thread therethrough.

BRIEF DESCRIPTION OF THE DRAWINGS

For a better understanding of the present invention, reference is made to the detailed description of embodiments, by way of example, which is to be read in conjunction with the following drawings, wherein like elements are given like reference numerals, and wherein.

DETAILED DESCRIPTION OF EMBODIMENTS

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Overview

In some computer architectures, for example in a RISC device, most of the instructions pass through a CPU pipeline. The instruction pipeline includes, in particular, the following stages:

a. Fetch stage: Responsible to fetch code instruction from the memory;

b. Decode stage: Responsible to decode (i.e., analyze) the fetched instruction;

c. Register stage: Responsible to read/write to/from the register file (the CPU internal fast memory); and d. Execution stage (or ALU): Responsible to execute most of the CPU instructions. The result of the execution stage is written back to the register file.

Generally the fetch stage of the pipeline is also responsible to manage the CPU program counter register. The program counter references the memory address from which the instructions are fetched. Instructions that directly affect the program counter are executed at the fetch stage and not the execution stage. In computers that support multithreading, the fetch stage is generally able to switch threads, first obtaining instructions from one thread, and then from another.

Each stage of the pipeline may sometimes become stalled, i.e., instructions cease flowing through the stalled stage. Well known causes of stalls include cache misses, and data hazards due to instruction dependencies, When a stage stalls, a signal is raised, referred to by its stage name, e.g., a "fetch stall" signal indicates a stalled fetch stage. While the stall signal is set, all the logic of the relevant stage is 'frozen'. When the stall condition disappears the stall signal is lowered. The terms "raised" and "lowered" are used arbitrarily herein to distinguish different signal states. These terms have no physical meanings with respect to the actual configuration of the signals.

When a stall condition occurs in one stage of the pipeline, instructions in other stages of the pipeline continue to flow, creating a "bubble", in which nothing useful happens in the following pipeline stages.

System Architecture

Figure 1:
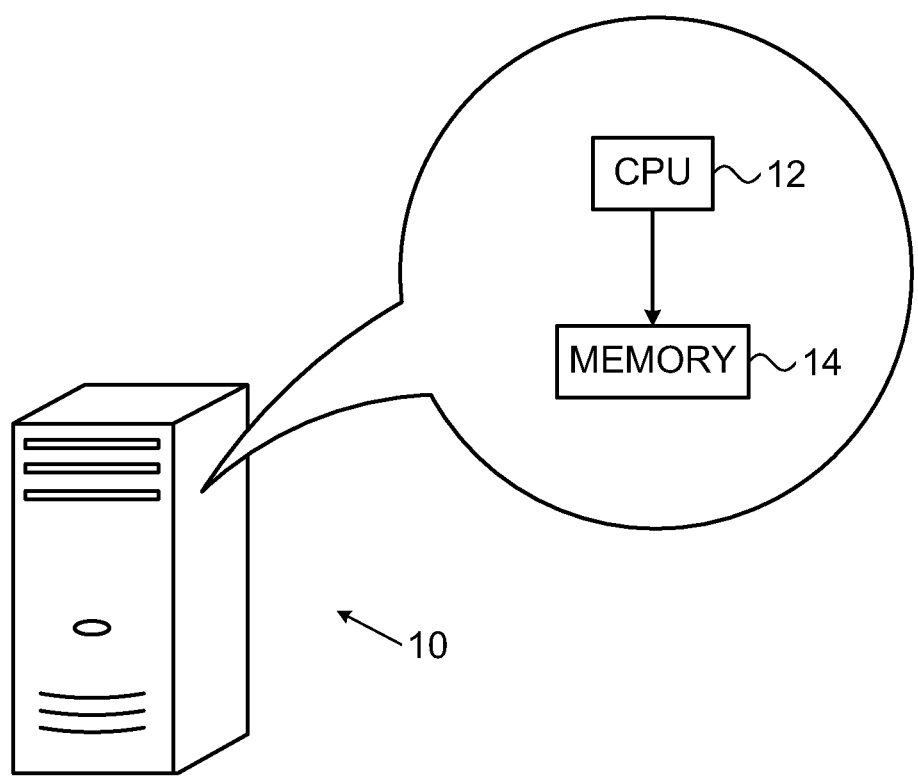
FIG. 1 is a schematic diagram of a computer system in which teachings of the present invention may be embodied.

Turning now to the drawings, reference is initially made to FIG. 1, which is a schematic diagram of a computer system 10, in which teachings of the present invention may be embodied. The system 10 comprises one or more central processing units (CPUs), shown representatively as CPU 12. The CPU 12 is cooperative with memory 14 in order to execute a variety of tasks, and supports multithreaded code execution. In accordance with techniques known in the art, numerous other components (not shown) may be incorporated in or utilized with the system 10, e.g., input/output devices comprising keyboards, displays, storage devices printers, and network interfaces.

Although the present invention is described in a particular hardware embodiment, those skilled in the art will appreciate that this is meant to be illustrative and not restrictive of the present invention. Many computer system configurations can be used to support and carry out the present invention, including, for example, configurations encompassing multiple processors, networked systems, and distributed networks and processors. For example, the system 10 may be embodied as a miniature integrated circuit card (smart card) containing microprocessor components. Accordingly, the teachings contained herein should be viewed as highly "scalable", meaning that they are adaptable to implementation on one, or several thousand, computer systems.

Figure 2:
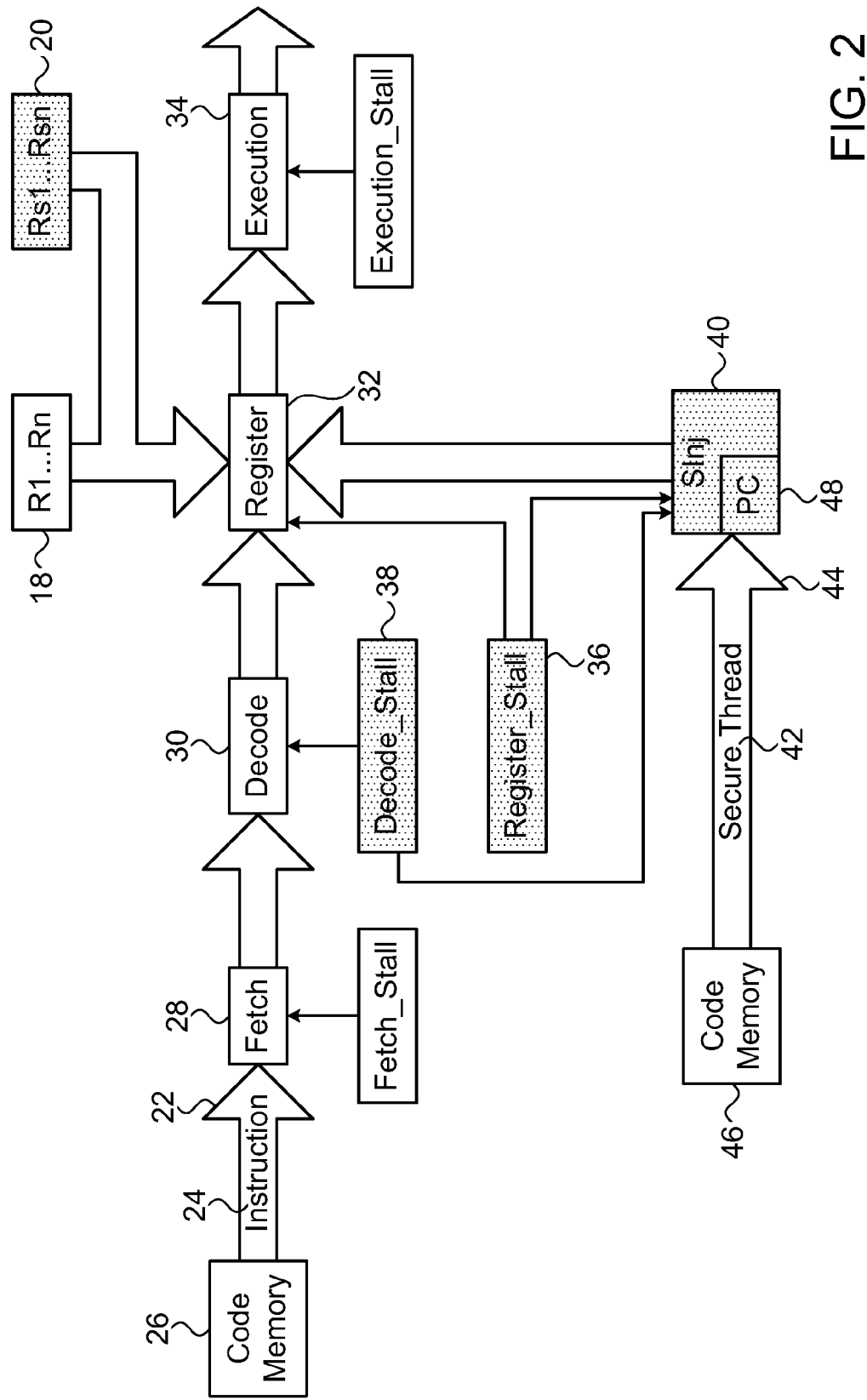
FIG. 2 is a detailed block diagram of an instruction pipeline of the CPU of the computer system shown in FIG. 1 in accordance with an embodiment of the invention.

Reference is now made to FIG. 2, which is a detailed block diagram of a portion of the CPU 12 (FIG. 1) in accordance with an embodiment of the invention. Included in FIG. 2 are instruction pipeline 16, a conventional file of registers 18, and a supplemental file of registers 20.

An instruction bus 22 delivers an instruction stream 24, comprising any number of non-secure threads when instructions are fetched from code memory 26 by fetch stage 28. The instruction pipeline 16 includes decode stage 30, register stage 32, and execution stage 34. The functions of these stages are given above. Signals set by stalls that occur from time to time in the various stages of the instruction pipeline 16 are indicated by labels placed respectively beneath the stages, including register stall signal 36 and decode stall signal 38, which are discussed below.

Relationships among stages in instruction pipelines described herein are sometimes described using the terms "upstream" and "downstream", wherein the term upstream used with respect to a stage denotes a position of another stage in a direction opposite the flow of data in the pipeline, i.e., toward the first stage of the pipeline, e.g., fetch stage 28. The term downstream denotes a position of another stage in a direction of the flow of data, i.e., toward the last shown stage of the pipeline, e.g., execution stage 34.

A secure code injector 40 (SInj) obtains instructions from a secure thread 42 via a bus 44 from code memory 46. The code memory 46 can be a separate memory store as shown in FIG. 2, or can be integral with code memory 26. For example, the code memory 46 could be a secure or a non-secure memory. In any case, the bus 22 and the bus 44 transfer thread instructions from respective memory address spaces and operate independently of one another in providing instructions to the fetch stage 28 and the secure code injector 40, respectively. Therefore, is both the fetch stage 28 and the secure code injector 40 may perform fetch operations concurrently. Either may initiate and terminate fetch operations without regard to the fetching activity of the other. The secure code injector 40 is enabled by the decode stall signal 38 cooperatively with absence of the register stall signal 36, and operates to fetch instructions of the secure thread 42 from the code memory 46 and inject the instructions into the register stage 32 of the instruction pipeline 16. It will be apparent to those skilled in the art that not all instructions need affect the program counter. For example, cryptographic algorithms, by their nature, are mostly formed as segments of linear code, generally looped a number of times. Instructions of the secure thread 42 that are injected into the register stage 32 can be limited to instructions that do not influence the CPU program counter, e.g., arithmetic load and store instructions. Such instructions do not involve jumps or branches in the program code. In other words, the instructions of the secure thread 42 are not control transfer instructions, and need not be handled by a fully qualified fetch stage. The flow of control of the secure thread is unaffected by the injected instructions, and loop control is handled internally within the secure code injector 40. A typical algorithm that may be processed in part as the secure thread 42 is the well-known AES algorithm. A code fragment of the AES algorithm suitable for execution as the secure thread 42 using the secure code injector 40 is shown in Listing 1. It will be evident that this fragment includes loops and ALU instructions, but does not otherwise include control transfer instructions.

Figure 3:
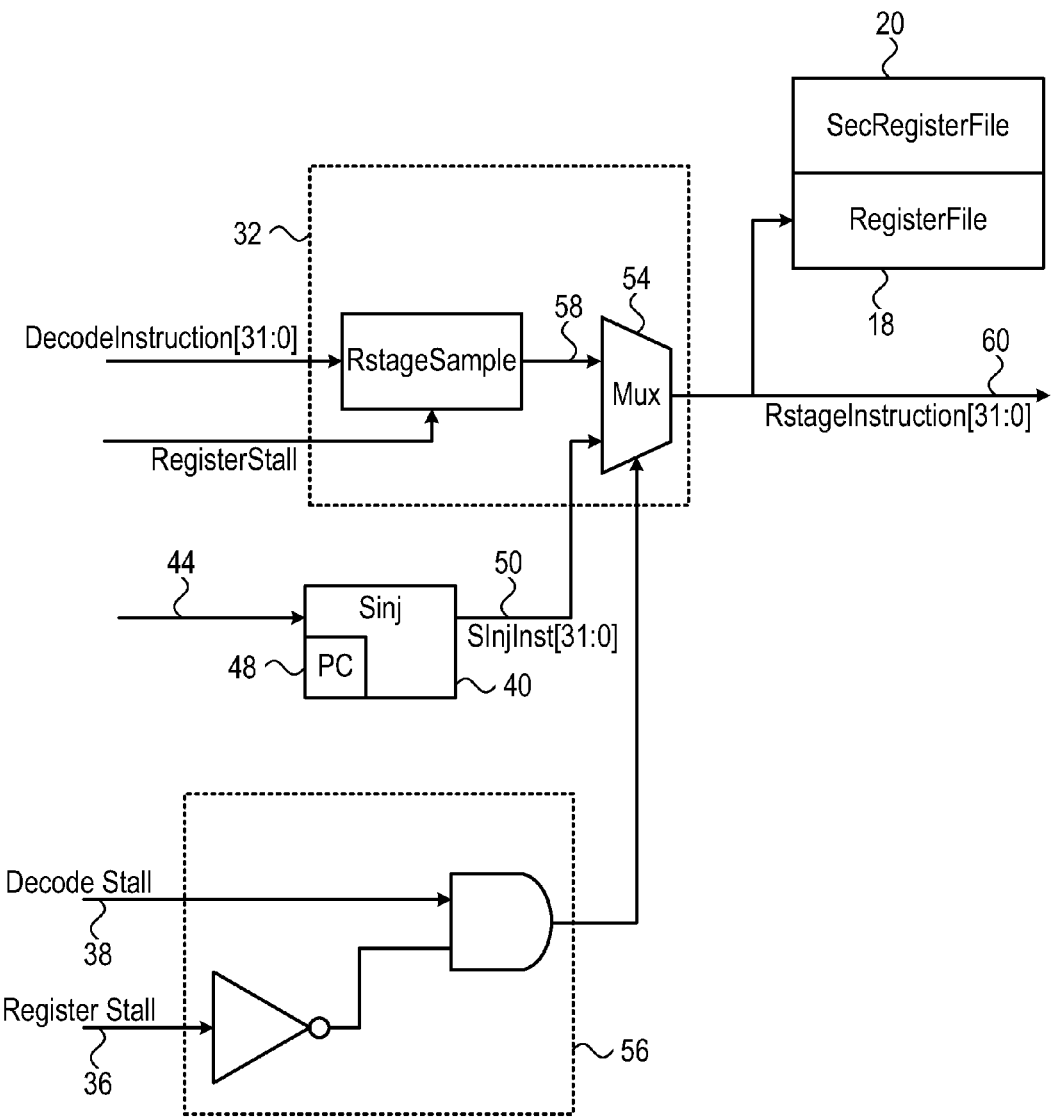
FIG. 3 is a detailed schematic diagram of a portion of the instruction pipeline of FIG. 2 in accordance with an embodiment of the invention.

Reference is now made to FIG. 3, which is a detailed schematic diagram of a portion of the instruction pipeline 16 (FIG. 2) in accordance with an embodiment of the invention. The secure code injector 40 can be implemented as a simple controller that is initialized by the starting address of a segment of linear code, its length and the number of loop iterations. The secure code injector 40 fetches consecutive instructions (as best seen in FIG. 2), and includes an ancillary program counter 48 for selecting addresses in the code memory 46, which, during loop execution always increments by a constant each time an instruction is fetched. The constant is the size of an instruction. The program counter 48 resets at each loop iteration. The secure code injector 40 pushes a consecutive instruction directly into the register stage 32 via a secure instruction bus 50 into an input 52 of a multiplexer 54. The input 52 is selected, via logical network 56, when the decode stall signal 38 (FIG. 2) is raised and the register stall signal 36 is lowered, that is, when the decode stage 30 is stalled and the register stage 32 is not stalled. Otherwise, a second input 58 is selected, transferring instructions from the non-secure instruction stream 24 (FIG. 2). Once the instructions exit the multiplexer 54, they continue to be processed in the following stages of the pipeline as shown by line 60. As noted above, the register stage 32 is further modified by expansion of its register file to permit the secure thread 42 to manipulate its own registers, registers 20, independently of the registers 18 and thereby operate in parallel to the non-secure thread (instruction stream 24, FIG. 2).

The secure code injector 40 and the bus 44 may be concealed within the integrated circuitry of the CPU 12 (FIG. 1), thereby hindering attempts at reverse engineering and obscuring its operation.

Figure 4:
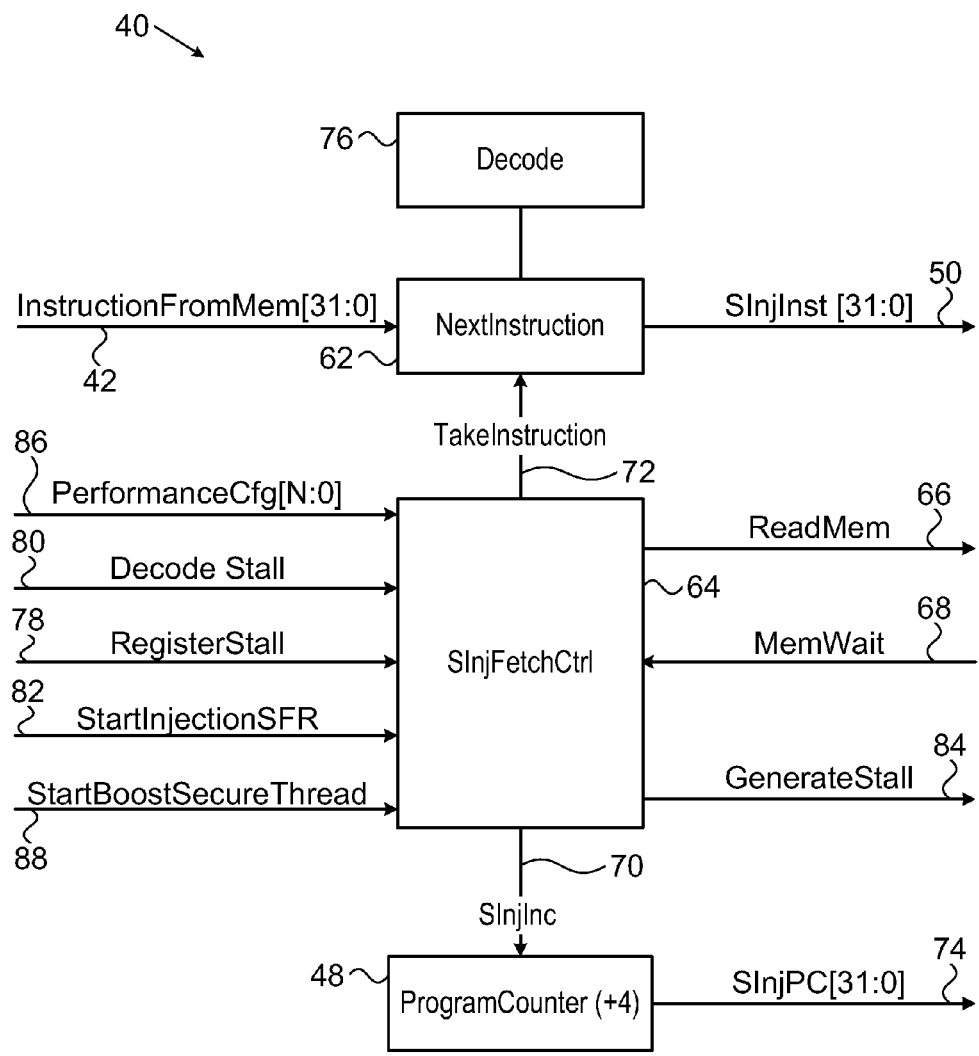
FIG. 4 is a detailed schematic diagram of a portion of the instruction pipeline in accordance with an embodiment of the invention.

Reference is now made to FIG. 4, which is a schematic diagram of the secure code injector 40 (FIG. 2), in accordance with an embodiment of the invention. The embodiment is shown at a high level and is exemplary. Alternative hardware designs suitable for use as the secure code injector 40 will occur to those skilled in the art. A register NextInstruction 62 stores the next instruction to be injected in the CPU when a decode stall exists. The program counter 48 controls the address of instructions to be fetched from the code memory 46 (FIG. 2) and placed in the register NextInstruction 62. An element SInjFetchCtrl 64 controls accesses to the code memory 46 using control lines 66, 68, updates the program counter 48 via control line 70, and updates the register NextInstruction 62 via control line 72. The program counter 48 addresses the code memory 46 via address bus 74.

A decode module 76 may be realized as a simplified design, as only a limited group of instructions need be processed in the secure code injector 40. Its input is the opcode of the instruction, and its outputs are an operation to be executed and the registers to be accessed. Such decoders are well-known in the art.

The register stall signal 36 and the decode stall signal 38 (FIG. 2) are received on control lines 78, 80, respectively. A control line 82 (StartInjection SFR) permits the main thread of the multi-threaded application to control processing of the secure thread 42 by the secure code injector 40 (FIG. 2).

Optionally, provision may be made to guarantee that a minimal number of instructions of the secure thread 42 are injected by the secure code injector 40, as determined by a given number of clock signals. This can be done by generating artificial decode stall signals on a control line 84, irrespective of the existence of a stall condition in the decode stage 30 (FIG. 2). Alternatively, the artificial decode stall signals may be generated only when a stall condition does not exist. A bus 86 (PerformanceCfg[N:0]) is added, which defines a predefined interval, during which the secure thread 42 monopolizes the instruction pipeline 16 (FIG. 2). A control line 88, StartBoostSecureThread enables this mode of operation. The line 88 is linked to a controller (not shown) that generates stall signals on control line 84.

Operation

Figure 5:
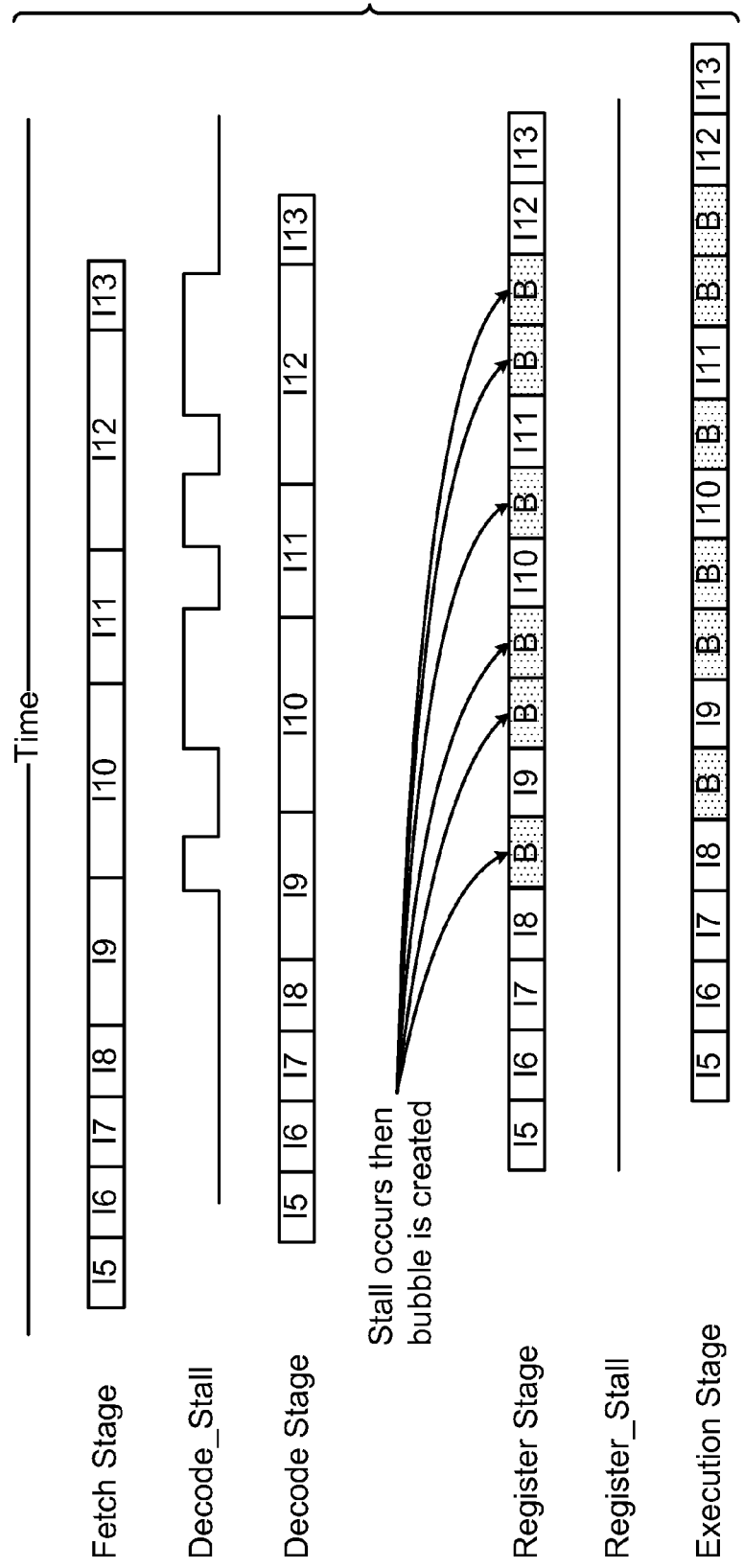
FIG. 5 is a timing diagram of the instruction pipeline shown in FIG. 2, in accordance with an embodiment of the invention.

Reference is now made to FIG. 5, which is a timing diagram of the instruction pipeline 16 (FIG. 2), in accordance with an embodiment of the invention. At pipeline step 18 the decode stage 30 stalls, causing a decode stall signal to be raised. The decode stall results in bubble formation in the register stage 32 following pipeline step 18. Bubbles are labelled "B" in FIG. 5. The decode stall signal 38 is raised and the register stall signal 36 is lowered during the stall condition.

The event of raising the decode stall signal 38 while the register stall signal 36 is lowered activates the secure code injector 40. When the decode stall disappears, the decode stall signal 38 is lowered. It will be apparent to those skilled in the art that in this embodiment, presence of the above-described combined states of the decode stall signal 38 and the register stall signal 36 is mostly unpredictable. Moreover, no reliance need be placed on the detection of NOP codes. Consequently, the execution of the secure thread is highly obfuscated. The secure code injector 40

Figure 6:
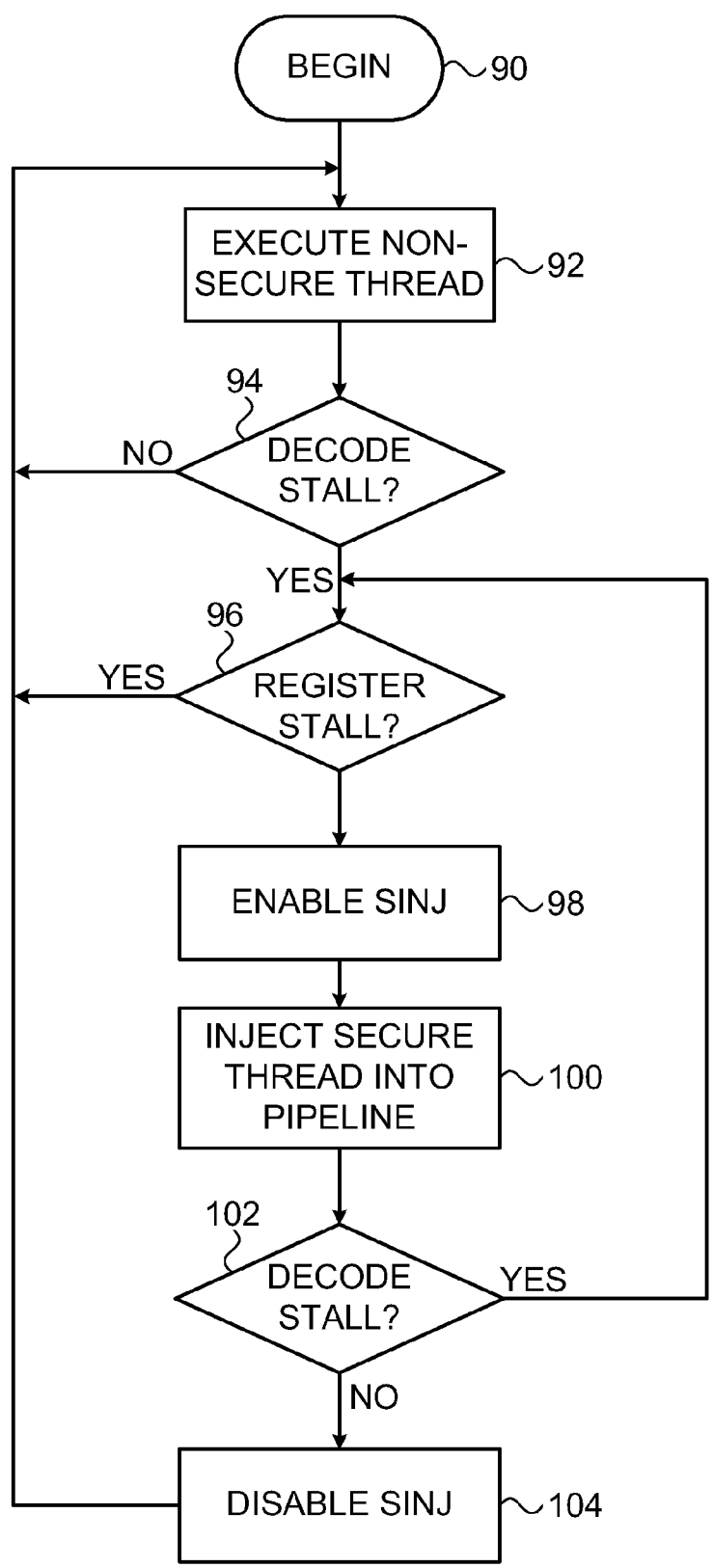
FIG. 6 is a flow chart describing a method of obfuscated hardware multi-threading in accordance with an embodiment of the invention.

Reference is now made to FIG. 6, which is a flow chart describing a method of obfuscated hardware multi-threading in accordance with an embodiment of the invention. The method may be carried out using the embodiments shown in FIG. 2 and FIG. 5. The process steps are shown in a particular linear sequence in FIG. 6 for clarity of presentation. However, it will be evident that many of them can be performed in parallel, asynchronously, or in different orders.

The process begins at initial step 90. Next, at step 92, the instruction pipeline 16 (FIG. 2) processes a non-secure thread of a program. The instruction stream 24 specifies the conventional registers 18 and does not affect the state of the registers 20. No pipeline stalls are currently occurring.

Control now proceeds to decision step 94, where it is determined if a decode stall has occurred. As noted above, this a decode stall is manifested by raising the decode stall signal 38, which is detected in the secure code injector 40.

If the determination at decision step 94 is negative, then control returns to step 92. If the determination at decision step 94 is affirmative, then at decision step 96 it is determined if a register stall exists. If the determination at decision step 96 is affirmative, then execution of the secure thread using the secure code injector 40 is not possible. Control returns to step 92.

If the determination at decision step 96 is negative, register stage 32 is operating normally. Control proceeds to step 98. The secure code injector 40 is enabled. Then, at step 100 the secure code injector 40 injects instructions of a secure thread directly into the register stage 32 of the instruction pipeline 16. These instructions specify the registers 20, and do not affect the state of the registers 18.

Control now proceeds to decision step 102, where it is determined if the decode stage is still stalled. This is the case if the decode stall signal 38 remains raised. If the determination at decision step 102 is affirmative, then control returns to decision step 96.

If the determination at decision step 102 is negative, then control proceeds to step 104. The secure code injector 40 is disabled, and execution of the non-secure thread resumes at step 92.

Alternate Embodiment 1

Exploitation of a decode stall condition as described above has an additional beneficial effect of enhancing pipeline efficiency and throughput, as pipeline cycles are not wasted by the presence of bubbles. In some multithreaded applications not requiring obfuscation, it may nevertheless be useful to exploit the secure code injector 40 (FIG. 2) by designating portions of one or more of the non-secure threads of an application as the secure thread 42 and processing the designated portions in the same manner as described above. A designated thread is typically a thread having a computationally intensive loop, but not involving many control transfer instructions.

Alternate Embodiment 2

Figure 7:
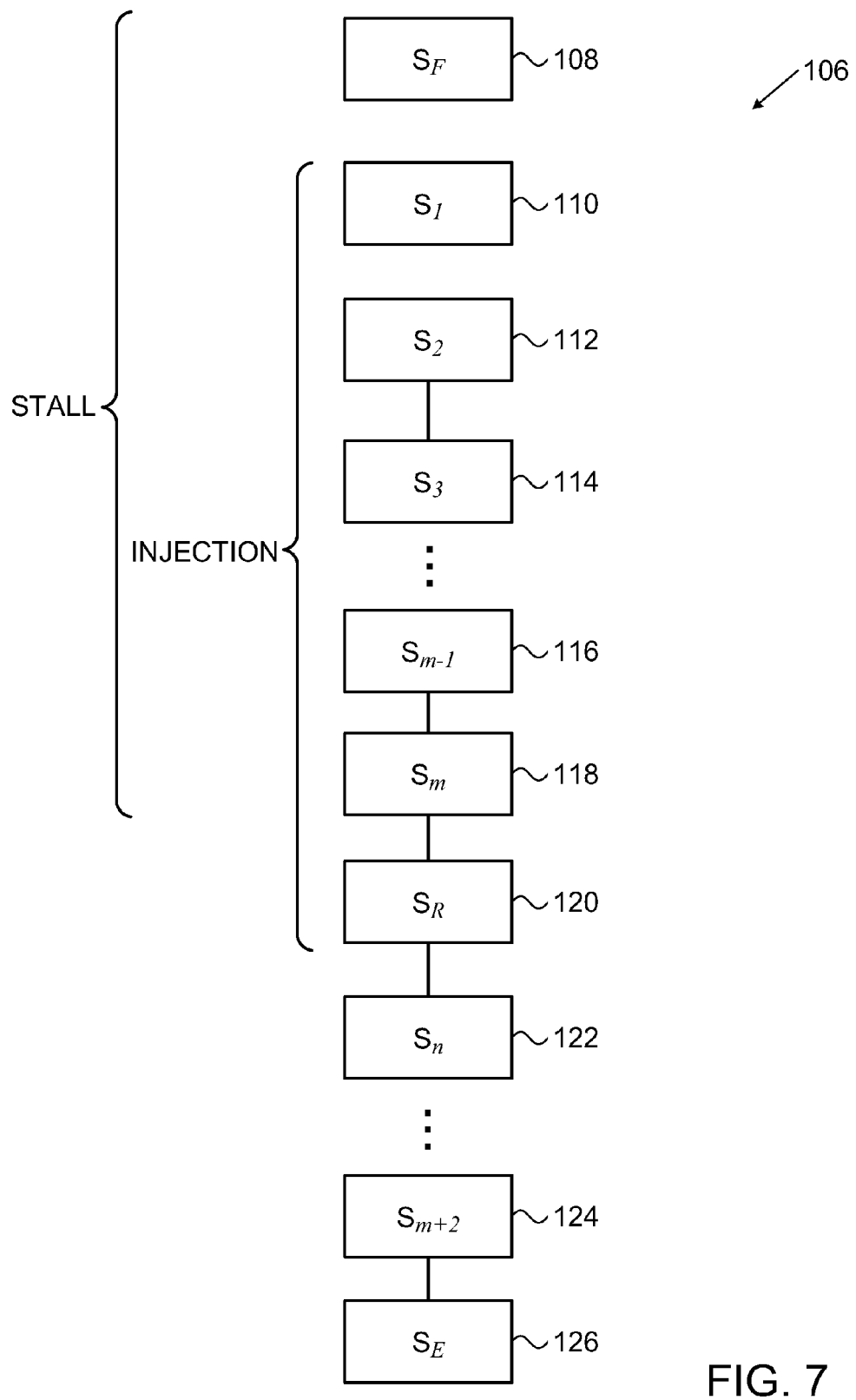
FIG. 7 is a schematic diagram of an instruction pipeline in accordance with an alternate embodiment of the invention.

In the first embodiment discussed above the instruction pipeline 16 (FIG. 2) is relatively short. The principles of the invention are applicable, mutatis mutandis to instruction pipelines having any number of stages, with many variations in the stage at which injection is performed and the stages at which a stall signal may be detected. Reference is now made to FIG. 7, which is a schematic diagram of a longer instruction pipeline 106 in accordance with an alternate embodiment of the invention, having a fetch stage 108, ($S_F$), intermediate stages 110, 112, 114, 116, 118, ($S_1, S_2, S_3, \ldots S_{m-1}, S_m$), a register stage 120 ($S_R$), additional intermediate stages 122, 124, ($S_{m+2}. S_n$), and execution stage 126 ($S_E$).

The secure code injector 40 (FIG. 2) can be configured to inject instructions in any of the stages downstream from the fetch stage 108 up to and including the register stage 120. A stall can be detected in any stage upstream of the injection stage, i.e., the stage at which instruction injection is performed. For example, if instruction injection occurs in stage 114, a stall may be detected in any of fetch stage 108, stage 110, or stage 112 (the stalled stage). It may be verified that the injection stage itself is not stalled. In any case, injection can begin after a delay of a requisite number of pipeline steps, until the leading end of the bubble created by the stall arrives at the injection stage. When the stalled stage resumes operation, the same delay is instituted before discontinuing injection, i.e., injection may continue until the trailing end of the bubble arrives at the injection stage. Otherwise the operation of the pipeline 106 is similar to that of the instruction pipeline 16 (FIG. 2).

Computer Program Listings
Listing 1

```
void AesEncryption(byte res[16], const byte data[16], const byte
aes_key[16])
{
static const word32 Rcon[4] =
    {0x1020408,0x10204080,0x1b366cd8,0xab4d9a2f};
    word32 state[4], key[4];
//copy the data and the key from the registers into RAM
//we assume that the state is stored as 4 words, each contains a raw
//the key is stored as 4 words, each contains a column
    state[0] = reg0;
    state[1] = reg1;
    state[2] = reg2;
    state[3] = reg3;
    key[0] = reg4;
    key[1] = reg5;
    key[2] = reg6;
    key[3] = reg7;
byte* state_bytes = (byte*) state;
byte* key_bytes = (byte*) key;
byte* Rcon_bytes = (byte*) Rcon;
int i = 0;
int round = 0,
loop 9 times:
    {
        //SubBytes+ShiftRows
        state[0] = SubBytes(state[0]);
        state[1] = Rotateword24L(state[1]);
        state[1] = SubBytes(state[1]);
        state[2] = Rotateword16L(state[2]);
        state[2] = SubBytes(state[2]);
        state[3] = Rotateword8L(state[3]);
        state[3] = SubBytes(state[3]);
        //prepare round key:
        word32 column = Rotateword24L(key[3]);
        column = SubBytes(column);
        key[0] ^= column ^ Rcon;
        key[1] ^= key[0];
        key[2] ^= key[1];
        key[3] ^= key[2];
        //MixColumns(res) + add round key;
        int i = 0;
loop 4 times:
    {
        column = state_bytes[4*3+i];
        column <<= 8;
        column |= state_bytes[4*2+i];
        column <<= 8;
        column |= state_bytes[4*1+i];
        column <<= 8;
        column |= state_bytes[4*0+i];
column = MixCommand(column) ^ key[i];
        state_bytes[4*0+i] = column;
        column >>= 8;
        state_bytes[4*1+i] = column;
        column >>= 8;
        state_bytes[4*2+i] = column;
        column >>= 8;
        state_bytes[4*3+i] = column;
i++;
    }
round ++;
}
state[0] = SubBytes(state[0]);
state[1] = Rotateword24L(state[1]);
state[1] = SubBytes(state[1]);
state[2] = Rotateword16L(state[2]);
state[2] = SubBytes(state[2]);
```

-continued

Computer Program Listings
Listing 1

```
state[3] = Rotateword8L(state[3]);
state[3] = SubBytes(state[3]);
word32 column = Rotateword24L(key[3]);
column = SubBytes(column);
key[0] ^= column ^ Rcon;
key[1] ^= key[0];
key[2] ^= key[1];
key[3] ^= key[2];
i = 0;
loop 4 times:
{
column = state_bytes[4*3+i];
column <<= 8;
column |= state_bytes[4*2+i];
column <<= 8;
column |= state_bytes[4*1+i];
column <<= 8;
column |= state_bytes[4*0+i];
column ^= key[i];
state_bytes[4*0+i] = column;
column >>= 8;
state_bytes[4*1+i] = column;
column >>= 8;
state_bytes[4*2+i] = column;
column >>= 8;
state_bytes[4*3+i] = column;
}
    //place the result in registers
    reg0 = state[0];
    reg1 = state[1];
    reg2 = state[2];
    reg3 = state[3];
}
```

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather the scope of the invention is defined by the appended claims and equivalents thereof:

The invention claimed is:

1. A method of obfuscating a multi-threaded computer program, comprising the steps of:
operating an instruction pipeline in a computer processor, the pipeline comprising a plurality of stages including a fetch stage for fetching computer instructions, an execution stage disposed downstream of the fetch stage for executing computer instructions and a register stage therebetween for accessing a register file;
streaming first instructions of a first thread of a multi-threaded computer application program into the pipeline, the first instructions entering the pipeline at the fetch stage;
detecting a stall signal indicative of a stall condition in the pipeline; and
responsively to the stall signal injecting second instructions of a second thread of the multi-threaded computer application program into the pipeline, the injected second instructions entering the pipeline at an injection stage that is disposed downstream from the fetch stage up to and including the register stage for processing therein, wherein the stall condition exists at one of the stages that is located upstream from the injection stage.

2. The method according to claim claim 1, further comprising detecting an additional signal indicating an absence of a stall condition in the injection stage before injecting second instructions therein.

3. The method according to claim 1, further comprising the steps of transferring the second instructions from the injection stage to the execution stage and executing the second instructions using the execution stage.

4. The method according to claim 1, wherein the injection stage is the register stage.

5. The method according to claim 1, wherein the stall condition exists at a decode stage located upstream of the register stage.

6. The method according to claim 1, wherein the injection stage is downstream from the decode stage.

7. The method according to claim 1, further comprising the steps of:
fetching the first instructions into the pipeline from a first memory address space using a first bus; and
fetching the second instructions into the pipeline from a second memory address space using a second bus.

8. The method according to claim 7, wherein fetching the first instructions is performed independently of fetching the second instructions.

9. The method according to claim 7, wherein injecting second instructions comprises providing an ancillary program counter for selecting addresses to be fetched from the second memory address space.

10. The method according to claim 1, wherein the second thread has a flow of control that is unaffected by processing the injected second instructions in the pipeline.

11. The method according to claim 1, wherein the first instructions and the second instructions operate on a first set of registers and a second set of registers, respectively.

12. The method according to claim 1, further comprising the step of generating the stall signal irrespective of an existence of the stall condition for a time sufficient to guarantee a minimum predetermined execution of the second thread.

13. The method according to claim 1, further comprising the steps of multiplexing the first thread and the second thread in the register stage of the pipeline.

14. An apparatus for use in a computing device for obfuscating a multi-threaded computer program, comprising:
a computer processor
an instruction pipeline in the computer processor, the pipeline comprising a plurality of stages including a fetch stage for fetching computer instructions, an execution stage disposed downstream of the fetch stage for executing computer instructions and a register stage therebetween for accessing a register file, the pipeline operative for streaming first instructions of a first thread of a multi-threaded computer application program into the pipeline, the first instructions entering the pipeline at the fetch stage; and
a code injector operative for detecting a stall signal indicative of a stall condition in the pipeline, and responsively to the stall signal injecting second instructions of a second thread of the multi-threaded computer application program into the pipeline, the injected second instructions entering the pipeline at an injection stage that is disposed downstream from the fetch stage up to and including the register stage for processing therein, wherein the stall condition exists at one of the stages that is located upstream from the injection stage.

15. The apparatus according to claim claim 14, wherein the code injector is operative for detecting an additional signal indicating an absence of a stall condition in the injection stage before injecting second instructions therein.

16. The apparatus according to claim 14, wherein the pipeline is operative for transferring the second instructions from the injection stage to the execution stage and executing the second instructions using the execution stage.

17. The apparatus according to claim 14, wherein the injection stage is the register stage.

18. The apparatus according to claim 14, wherein the stall condition exists at a decode stage located upstream of the register stage.

19. The apparatus according to claim 14, wherein the injection stage is downstream from the decode stage.

20. The apparatus according to claim 14, further comprising a first bus and a second bus, wherein the pipeline is operative for fetching the first instructions into the pipeline from a first memory address space using the first bus;, the code injector is operative for fetching the second instructions into the pipeline from a second memory address space using the second bus.

21. The apparatus according to claim 20, wherein the fetch stage and the code injector are independently operative for fetching the first instructions and fetching the second instructions, respectively.

22. The apparatus according to claim 20, wherein the code injector comprises an ancillary program counter for selecting addresses of the second instructions to be fetched from the second memory address space.

23. The apparatus according to claim 14, wherein the second thread has a flow of control that is unaffected by processing the injected second instructions in the pipeline.

24. The apparatus according to claim 14, wherein the computer processor comprises a first set of registers and a second set of registers, wherein the first instructions and the second instructions specify the first set of registers and the second set of registers, respectively.

25. The apparatus according to claim 14, further comprising a generator operative for raising the stall signal irrespective of an existence of the stall condition for a time sufficient to guarantee a minimum predetermined execution of the second thread.

26. The apparatus according to claim 14, further comprising a multiplexor in the pipeline for multiplexing the first thread and the second thread therethrough.

* * * * *